(12) United States Patent
Benson et al.

(10) Patent No.: US 6,651,169 B1
(45) Date of Patent: *Nov. 18, 2003

(54) PROTECTION OF SOFTWARE USING A CHALLENGE-RESPONSE PROTOCOL EMBEDDED IN THE SOFTWARE

(75) Inventors: Glenn Benson, Munich (DE); Markus Dichtl, Munich (DE)

(73) Assignee: Fujitsu Siemens Computers, Münich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,817

(22) Filed: Sep. 30, 1997

(30) Foreign Application Priority Data

May 28, 1997 (EP) .............................. 97710012

(51) Int. Cl.[7] .................................. H04L 9/32
(52) U.S. Cl. ...................... 713/193; 380/201; 713/182; 713/189
(58) Field of Search .............................. 380/4, 23, 25, 380/201; 713/189, 182, 193

(56) References Cited

U.S. PATENT DOCUMENTS 5,351,293 A    9/1994  Michener et al.

FOREIGN PATENT DOCUMENTS

WO    WO/88 05941        8/1988
WO    WO88/05941    *   8/1988

OTHER PUBLICATIONS

Bruce Schneier, Applied Cryptography, John Wiley & Sons, p. 48 and 49 1994.*
Eastlake et al, Randomness Recommendations for Security Dec. 1994.*
Davis et al., "Cryptographic Randomness from Air Turbulence in Disk Drives", Advances in Cryptology: Crypto '94, Springer Verlag, pp. 114–120.
A. Menezes et al., Handbook of Applied Cryptography, CRC Press, pp. 405–424.
A. Choudhury et al., "Copyright Protection for Electronic Publishing Over Computer Networks", IEEE Network, May/Jun. 1995, pp. 12–20.
ISO/IEC 9594–1, "Information technology—Open Systems Interconnection—The Directory: Overview of concepts, models and services", International Organization for Standardization, Geneva, Switzerland, 1995, pp. 1–20.
R. Rivest, "The MD5 Message–Digest Algorithm", RFC 1321, pp. 1–18.
D. Knuth, The Art of Computer Programming, vol. 2, Seminumerical Algorithms, Addison–Wesley Publishing Co., Reading MA, 2nd Edition, 1981, pp. 38–73.
R. Laun, "Asymmetric User Authentication", Computers & Security, Elsevier Science Publishers Ltd., Apr. 1992, No. 2, Oxford, GB, pp. 173–183.

* cited by examiner

Primary Examiner—Gail Hayes
Assistant Examiner—James Seal
(74) Attorney, Agent, or Firm—Shiff Hardin & Waite

(57) ABSTRACT

A method for protecting an item of software, wherein at least one challenge is associated with the protected item of software, and at least one response accesses one private keying material. The challenge has no access to the private keying material. The challenge and the response are generating shared secret information, respectively, in accordance with an asymmetric confidentiality scheme. The response proves that it discovered the shared secret and the challenge validates the proof. The challenge proof validation procedure uses the public keying material that corresponds to the response private keying material.

50 Claims, 3 Drawing Sheets

PROTECTION OF SOFTWARE USING A CHALLENGE-RESPONSE PROTOCOL EMBEDDED IN THE SOFTWARE

BACKGROUND OF THE INVENTION

1. Field of the Invention

The present invention relates to mechanisms for protecting software against unauthorized use, in particular against unauthorized copying.

2. Description of the Related Art

The Business Software Alliance estimates the 1995 financial losses attributed to software piracy as US$ 8.1 Billion for business application software and US$ 15.2 Billion for all software.

Solutions have been proposed in two areas:

improved Intellectual Property Rights (IPR) legislation, and enhanced electronic copy protection (ECP) mechanisms.

IPR legislation and enforcement are improving in many countries, but there are still significant difficulties in other parts of the world. As a result, some vendors are currently reassessing ECP.

Some example requirements that an ECP mechanism may potentially satisfy are listed below:

Unauthorized users or customers should be prohibited from executing protected software.

The customer should not be prohibited from making backups.

The ECP mechanism should have minimal impact upon the user interface. The visible impact should be limited to the first initial login to the operating system and/or smart card.

Only standard hardware and software assumptions should be made. For example, although hardware dongles provide copy protection services, many vendors do not wish to limit the sale of the software to the collection of customers who own or are willing to install a dongle.

The ECP mechanism should not limit execution of the protected software to a limited collection of machines. When a customer legitimately purchases software, the customer should be able to execute the software on any machine regardless of ownership. The customer should optionally be able to authorize simultaneous execution of the software in multiple machines.

The ECP mechanism should have no required network dependencies in order to execute an already purchased protected program.

The vendor should be permitted to distribute an identical version of the protected software to all customers. This requirement permits the protected software to be distributed through normal channels such as, for example, CD-ROMs, floppy disks, or network bulletin boards.

It should be excessively difficult and/or computationally infeasible for a potential software pirate to circumvent the ECP mechanism without modifying the protected program. This requirement serves as a virus-protection measure because a digital signature supplied by the vendor would not validate if a pirate distributes a modified version of the original program.

The ECP mechanism should not disclose the private keying material to the vendor, to any program produced by the vendor, or to any potential Trojan horse program. Though the primary functionality is to protect the software vendor, one must not do so at the expense of the customer.

The ECP mechanism should be available in a software-only version as well as in a hardware-assisted version, using a smart card, for example, to assure widespread market acceptance.

In the Choudhury et al. publication, "Copyright Protection for Electronic Publishing over Computer Networks", a mechanism is proposed in which a protected document can be viewed only via a specially configured viewer program, which allows a customer to view the document only if the customer supplies to the viewer the customer's private keying material. This deters the customer from distributing unauthorized copies of the viewer program since that would require the customer to divulge his or her private keying material to others. However, because this mechanism requires that the viewer program obtain access to the private keying material, it violates one of the requirements described above. Furthermore, this mechanism may not be used in conjunction with a smart card that is configured to avoid releasing private keying material.

An overview of asymmetric cryptography, for example of the RSA (Rivest-Shamir-Adleman) scheme, and probabilistic encryption, for example the Blum-Goldwasser probabilistic public-key encryption scheme, can be found in a book by Menezes, et al., "Handbook of Applied Cryptography".

The Chi-Square Test, the Kolmogorov-Smirnov Test, and the Serial Correlation Test are described in a publication by Knuth, "The Art of Computer Programming."

An overview of digital signature schemes (e.g. Rivest-Shamir-Adleman (RSA), etc.,) can be found in the Menezes book.

In a publication by Fenstermacher et al., cryptographic randomness from air turbulence in disk drives is described.

An example of a message digest function (otherwise known as a one-way hash function) is MD5, see Rivest, "The MD5 Message-digest Algorithm." It is computationally infeasible or very difficult to compute the inverse of a message digest.

SUMMARY OF THE INVENTION

An object of the present invention is to provide an improved ECP (electronic copy protection) mechanism that is able to satisfy most, if not all, of the example requirements described above.

The present invention makes use of an asymmetric confidentiality protocol. An asymmetric confidentiality protocol involves two parties, A and B. A possesses private keying material and B has no access to A's private keying material without disclosing the private keying material itself. At the beginning, A and B have no shared secret. During the method, a shared secret becomes known to A and B. A proves to B that A has access to the private keying material.

An example of an asymmetric confidentiality proof is public key encryption. As illustrated in the asymmetric confidentiality protocol below. A proves to B that A has access to the private keying material.

$A \leftarrow B$: $h(r)$, B, $P_A(r,B)$ $A \rightarrow B$: r

The protocol scheme described above uses the following notation:

$A \rightarrow B$ denotes that A sends a message to B; and $B \rightarrow A$ denotes that B sends a message to A.

r denotes a random number used as a nonce $h(r)$ is a message digest of the nonce $P_A(r,B)$ is encryption of the nonce and B's identity using A's public keying material.

Here, B generates a nonce and encrypts the nonce (together with B's identity) using A's public keying material, i.e., $P_A(r,B)$.

Additionally B computes the message digest of the nonce, $h(r)$.

B sends the information described above, along with a value representing B's identity, to A.

Next, A uses its private keying material to decrypt $P_A(r,B)$ obtaining r,B. A computes the message digest of the decrypted random value, r, and compares the result against $h(r)$ obtained from B.

At this point, the random number is a shared secret known by both A and B.

In order to complete the protocol, A returns the random number to B in order to demonstrate that A knows the secret. Of course, once A provides the disclosure, the secrecy of the random number is lost. B validates A's proof by checking for equality A's returned secret against the one that B originally generated.

A second example of an asymmetric confidentiality protocol is a probabilistic encryption scheme, e.g. the Blum-Goldwasser probabilistic public key encryption scheme. Here, the encryption or decryption mechanism uses random numbers or other probabilistic means.

In all asymmetric confidentiality protocols, each customer may post his or her public keying material to a publicly accessed directory without compromising the corresponding private keying material. The customer usually should guard his or her private keying material as a close secret; otherwise, the cryptographic system may not guarantee correctness (in other words, secrecy). The best known mechanism for protecting one's private keying material is through the use of a smart card. In this case, the smart card is a device with no interface for releasing private keying material (in a non-cryptographically protected form).

Although smart cards provide the best protection, social factors of electronic commerce may provide a role in ensuring private keying material protection. One of the significant difficulties associated with asymmetric encryption services is authentication. For example, if A posts his or her public keying material to a public directory, then how does B assess validity? That is, a pirate may attempt to masquerade as A but post the pirate's keying material. Some commercial organizations provide solutions to this problem by acting as Certification Authorities (CA). For (possibly) a fee, the CA solicits identifying material from potential customers such as a driver's license or passport. After validating the identifying material, the CA posts the customer's public keying material to a public directory, and the CA signs a certificate (using a digital signature with the CA's private key) that holds the customer's public keying material. Standardized services, for example X.500, may be adopted to help facilitate the use of directories that contain public keying material.

Once a customer posts his or her public keying material to the CA (certification authorities), the customer will probably make an extensive effort to protect his or her private keying material. For some asymmetric keys, if the customer's private keying material were to become unknowingly compromised, then the customer would have cause for significant concern. For example, in the case of RSA keys that can also be used for digital signatures, networked vendors could potentially authorize electronic commerce transactions.

According to the invention there is provided a computer system comprising a protection mechanism for protecting software, the protection mechanism comprising at least one challenge means associated with a protected item of software, and at least one response means with private keying material that it can access, wherein:

a) the challenge means has no access to the private keying material, b) the challenge means and the response means comprise means for generating shared secret information, respectively, in accordance with an asymmetric confidentiality scheme, c) the response means comprises means for proving to the challenge means that the response means has access to the private keying material by interacting with the challenge means using an asymmetric confidentiality proof scheme, d) the challenge means comprises means for prohibiting a customer from using some or all of the items of software unless the proof is successful.

According to a further aspect of the invention, there is provided a computer system comprising means for inputting a program to be protected, and for embedding at least one challenge means in that program, wherein the challenge means comprises means for generating shared secret information in accordance with an asymmetric confidentiality scheme, validating the response means' proof that the response means knows the shared secret information and for prohibiting a customer from using some or all of the items of software unless the proof is successful.

According to a further aspect of the invention there is provided a method of distributing software to a plurality of customers wherein each customer has a computer system comprising a protection mechanism for protecting software, the protection mechanism comprising at least one challenge means associated with a protected item of software, and at least one response means with private keying material that it can access, wherein:

a) the challenge means has no access to the private keying material, b) the challenge means and the response means comprise means for generating shared secret information in accordance with an asymmetric confidentiality scheme, c) the response means comprises means for proving to the challenge means that the response means has access to the private keying material by interacting with the challenge means using an asymmetric confidentiality proof scheme, and d) the challenge means comprises means for prohibiting a customer from using some or all of the items of software unless the proof is successful, and wherein every customer receives an identical copy of the protected program and of the challenge means.

According to a further aspect of the invention, there is provided a method for protecting an item of software, wherein at least one challenge means is associated with the protected item of software, and at least one response means accesses private keying material, a) the challenge means has no access to the private keying material, b) the challenge means and the response means generate shared secret information, respectively, in accordance with an asymmetric confidentiality scheme, c) the response means proves to the challenge means that the response means has access to the private keying material, d) the challenge means prohibits a customer from using some or all of the items of software unless the proof is successful.

According to a further aspect of the invention, it may be advantageous to generate a random challenge by repeatedly timing responses to device accesses in order to enforce the security of the random challenge. Although one may potentially time responses to any one of a variety of devices, in this present example we assume a disk (commonly known as a hard disk and sometimes known as a direct access storage device) is used. Additionally, it is possible to query multiple different devices when generating one particular random value.

According to a further aspect of the invention, in order to further enforce the security of the random challenge one may, while generating the random challenge, fork new threads in such a manner as to introduce an additional degree of randomness into the random challenge by exploiting unpredictabilities in the operating system's scheduler.

According to a further aspect of the invention, in order to further enforce the security of the random challenge, one may perform a statistical test to determine the number of random bits obtained by each of the disk accesses and cause disk accesses to be repeated until a predetermined number of random bits has been obtained.

DETAILED DESCRIPTION OF PREFERRED EMBODIMENTS OF THE INVENTION

One protection mechanism in accordance with the invention will now be described by way of example with reference to the accompanying drawings.

Purchasing Protocol

Figure 1:
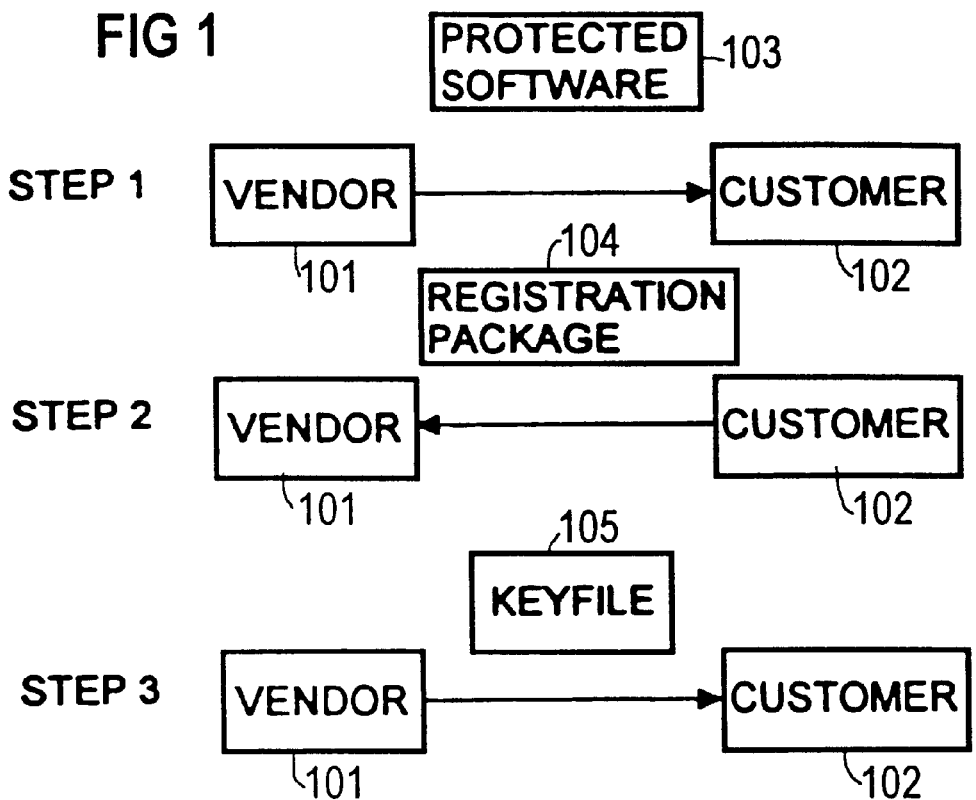
FIG. 1 is a flow diagram of a purchasing protocol used when a customer wishes to purchase software that is protected by a protection mechanism in accordance with the invention

FIG. 1 shows a purchasing protocol used when a customer 102 wishes to purchase software that is protected by an ECP (electronic copy protection) mechanism in accordance with the invention. The vendor 101 has public and private keying material used for digital signatures; and each potential customer 102 has public and private keying material used for asymmetric confidentiality proof protocols. Each party makes its public keying material available to other parties but keeps its private keying material secret.

In step 1, the customer 102 obtains protected software 103 from the vendor 101 by downloading the software from a network bulletin board.

Figure 2:
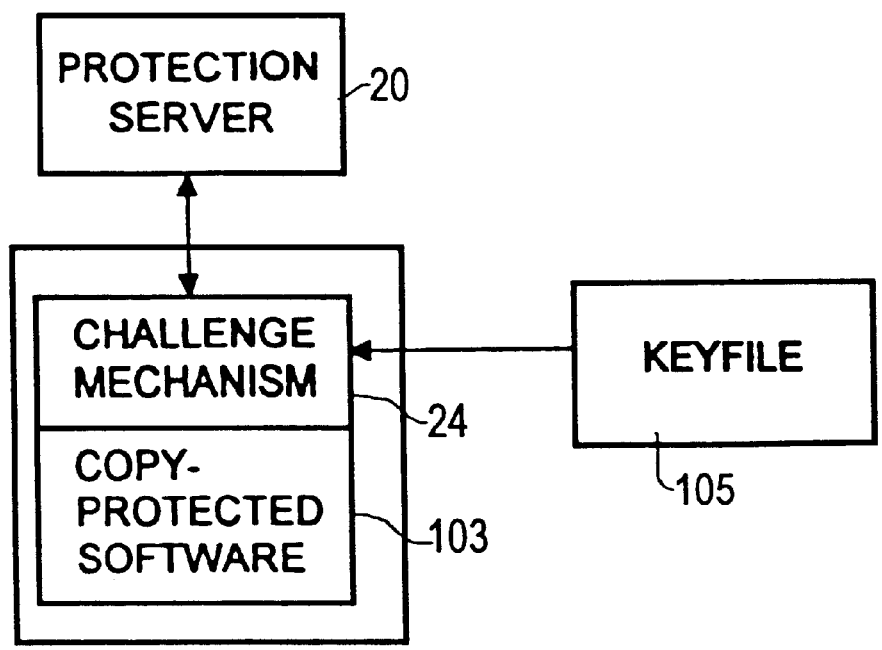
FIG. 2 is a block diagram showing the software components that are required to be installed in the customer's machine to enable the customer to run the protected software.

A challenge mechanism 24 (cp. FIG. 2), to be described later in detail, is embedded in the protected software 103 in such a way that a potential attacker cannot easily separate the challenge mechanism 24 from the protected program 103. The attacker would need to disassemble the code and to manually remove the challenge mechanism. The challenge mechanism 24 has the vendor's public keying material embedded in it. As will be described, the challenge mechanism 24 prevents the customer from running the software at this stage. The entire protected program, including the challenge mechanism, is signed using the vendor's private keying material.

In step 2, the customer 102 sends a registration package 104 to the vendor 101 by electronic mail. The registration package 104 contains a reference to a public directory that holds the customer's public keying material.

In step 3, the software vendor 101 locates the customer's public keying material and embeds the customer's public keying material into a keyfile 105 and sends the keyfile 105 to the customer 102 by electronic mail. Once the customer 102 installs the keyfile 105, the protection mechanism permits the customer 102 to execute the protected software 103, provided that the customer can prove that he or she has access to the customer's private keying material via an asymmetric confidentiality proof.

The creation of the keyfile 105 is performed by a keyfile generator, which is a program that executes at the vendor's facility. The vendor 101 must take care to guard this program.

In use of the keyfile generator, an operator enters the following information:

Vendor name: Vendor name is the name of the vendor's company.

Vendor password: Vendor password is the password that unlocks the vendor company's private keying material. Company employees who do not know the password cannot generate keyfiles.

Customer name: The customer name is the distinguished name of a customer (defined in ISO/IEC 9594-1, "Information Technology—Open Systems Interconnection—The Directory: Overview of Concepts, Models and Services")for whom to generate a keyfile. The name indexes into a database of public keying material.

Keyfile name: The keyfile name is the name of a new keyfile.

After obtaining this information, the keyfile generator builds a keyfile 105 containing the customer's public keying material. Portions of the keyfile 105 appears to the customer 102 as a completely random sequence of values.

Building of the keyfile 105 involves the following operations.

First, the keyfile generator creates a file and inserts the customer's public keying material into the file, along with thousands of decoy bits. In the present example, each keyfile 105 contains approximately 480,000 decoy bits. This number of bits represents a significant amount of decoy material, yet can fit into a standard e-mail (electronic mail) message.

Each keyfile 105 stores the customer's public keying material in a different location. Additionally, each keyfile 105 has encrypted customer information embedded in it without disclosing the required encryption key. This encrypted customer information permits a software vendor to easily identify the owner of a keyfile 105 in the event that the keyfile 105 appears in a public location, such as a bulletin board. The keyfile generator then encrypts and re-encrypts the keyfile (or portions of the keyfile) 105 multiple times, using different algorithms. Finally, the keyfile generator signs the keyfile 105 using the vendor's private keying material by applying a digital signature algorithm.

A keyfile is said to be validated if the challenge means can validate the vendor's signature using the public keying material stored in the challenge means' binary and access the decrypted public keying material stored in the keyfile.

Customer Software

FIG. 2 shows the software components that are required to be installed in the customer's machine, such as a computer, to enable the customer 102 to run the protected software 103. These consist of a protection server 20. Also shown are the keyfile 105 and the protected software 103. The copy protected software 103 includes a challenge mechanism 24.

The protection server 20 is a program that the customer 102 executes when the system initially boots. The customer 102 enables the system by inserting a floppy disk that contains an encrypted copy of the customer's private keying material. The protection server 20 then prompts the customer 102 for a pass phrase used to decrypt the floppy. The protection software does not continue executing if the customer cannot supply the correct pass phrase. The protection server 20 then executes in the background waiting for requests for executing the asymmetric confidentiality protocol.

It should be noted that the protection server 20 never releases the customer's private keying material out of its process boundary. The protection server 20 relies on operating system protections to ensure its own integrity. The protection server 20 executes in its own address space and communicates with external processes.

Operation of the Protection Mechanism

Figure 3:
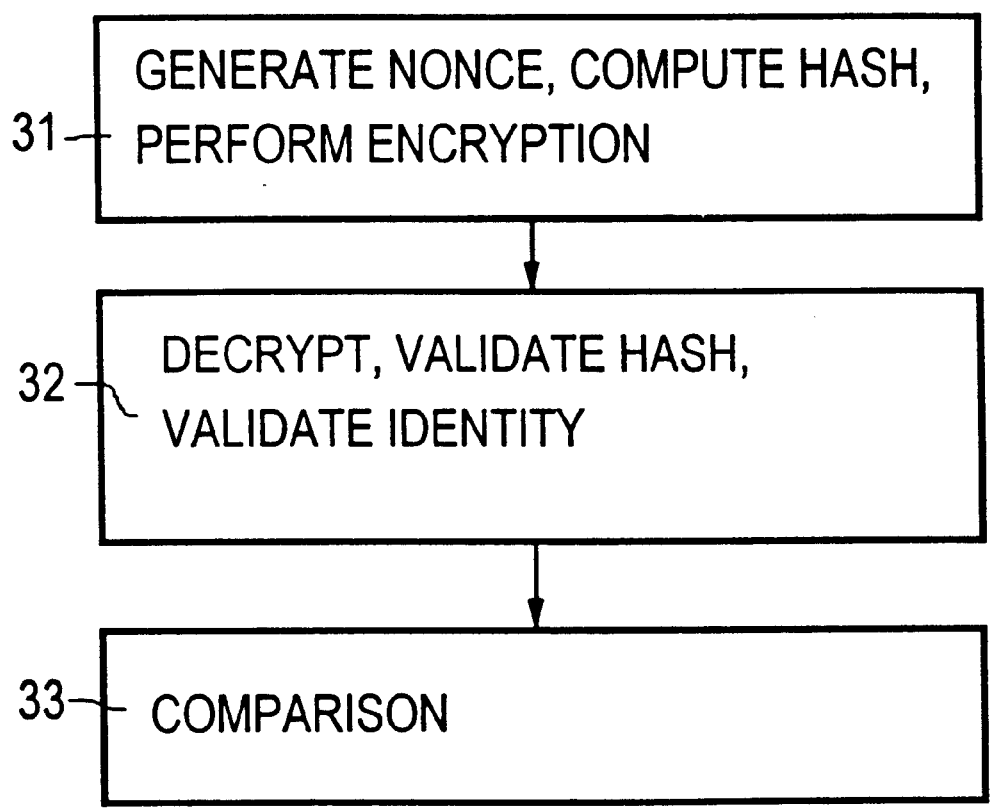
FIG. 3 is a flow diagram showing the operation of the protection mechanism in the protected software.

FIG. 3 shows the operation of the protection mechanism. This is performed when the customer initially attempts to execute the protected software 103, and is also repeated periodically during execution of the protected software 103, by sending a new challenge and waiting for a response that can be validated.

(Box 31) When the challenge mechanism 24 starts the process, the challenge mechanism 24 accesses the keyfile 105 associated with the protected software 103 and calls a signature validation function in the challenge mechanism 24 to validate the vendor's signature of the keyfile 105 using the vendor's public keying material that is embedded in the challenge mechanism 24. This validation of the keyfile signature ensures that an attacker cannot modify the keyfile 105 or its digital signature without additionally modifying the challenge mechanism 24. Vendors may optionally augment this protection using additional proprietary lines of defense. If the keyfile 105 has been modified, the challenge mechanism 24 hangs, or halts, the program, or otherwise disturbs the normal program execution.

Assuming the signature of the keyfile 105 is validated, the challenge mechanism 24 then parses the keyfile 105, using a proprietary, vendor-specific algorithm, to locate the customer's public keying material in the keyfile 105, and extracts the customer's public keying material.

The challenge and response means execute the asymmetric confidentiality protocol as illustrated below.

$A \leftarrow B: h(r), B, P_A(r,B)$ $A \rightarrow B: r$

The Figure uses the following notation:

Challenge means (challenge mechanism) 24 denoted by A (also denotes A's identity, e.g., "copy protected program x")

Response means (protection server) 20 denoted by B (also denotes B's identity, e.g., "protection server version 1".

r denotes a random number used as a nonce h(r) is a message digest of the nonce $P_A(r,B)$ is encryption of the nonce and B's identity using A's public keying material.

(Box 31) The challenge means 24 of the protected software 103 generates an unguessable nonce (random number). Next, the challenge means computes h(r) (the message digest of r).

The challenge mechanism 24 then calls an encryption function in the challenge mechanism 24 to encrypt the nonce and B's identity with the customer's public keying material. The challenge mechanism passes the message digest of the nonce h(r), B's identity, and the result of the encryption to the protection server 20 with a request for participating in an asymmetric confidentiality proof.

(Box 32) When the protection server 20 receives the request, it first decrypts the encrypted portion of the message using the customer's private keying material.

Next, the protection server validates h(r) against the decrypted value.

Next, the protection server 20 validates that its identity, B, appears in the message and the decrypted value correctly.

If any validation fails, the protection server 20 returns failure without returning the decrypted nonce. However, if the validation succeeds, then the protection server 20 returns the decrypted nonce.

(Box 33) The challenge mechanism 24 compares the received decrypted nonce with the nonce that the challenge mechanism 24 originally encrypted. If they are not the same, the challenge mechanism 24 hangs (halts) the protected program, or otherwise disturbs normal program execution.

Thus, it can be seen that the protected program continues executing normally only if the customer possesses the proper private keying material and keyfile 105.

Nonce Generator

Generation of a nonce is performed by a nonce generator included in the challenge mechanism 24. Operation of the nonce generator is as follows.

First, the nonce generator queries a large number of system parameters, e.g. the system time, the amount of space remaining free in the page table, the number of logical disk drives, the names of the files in the operating system's directory, etc.

Figure 4:
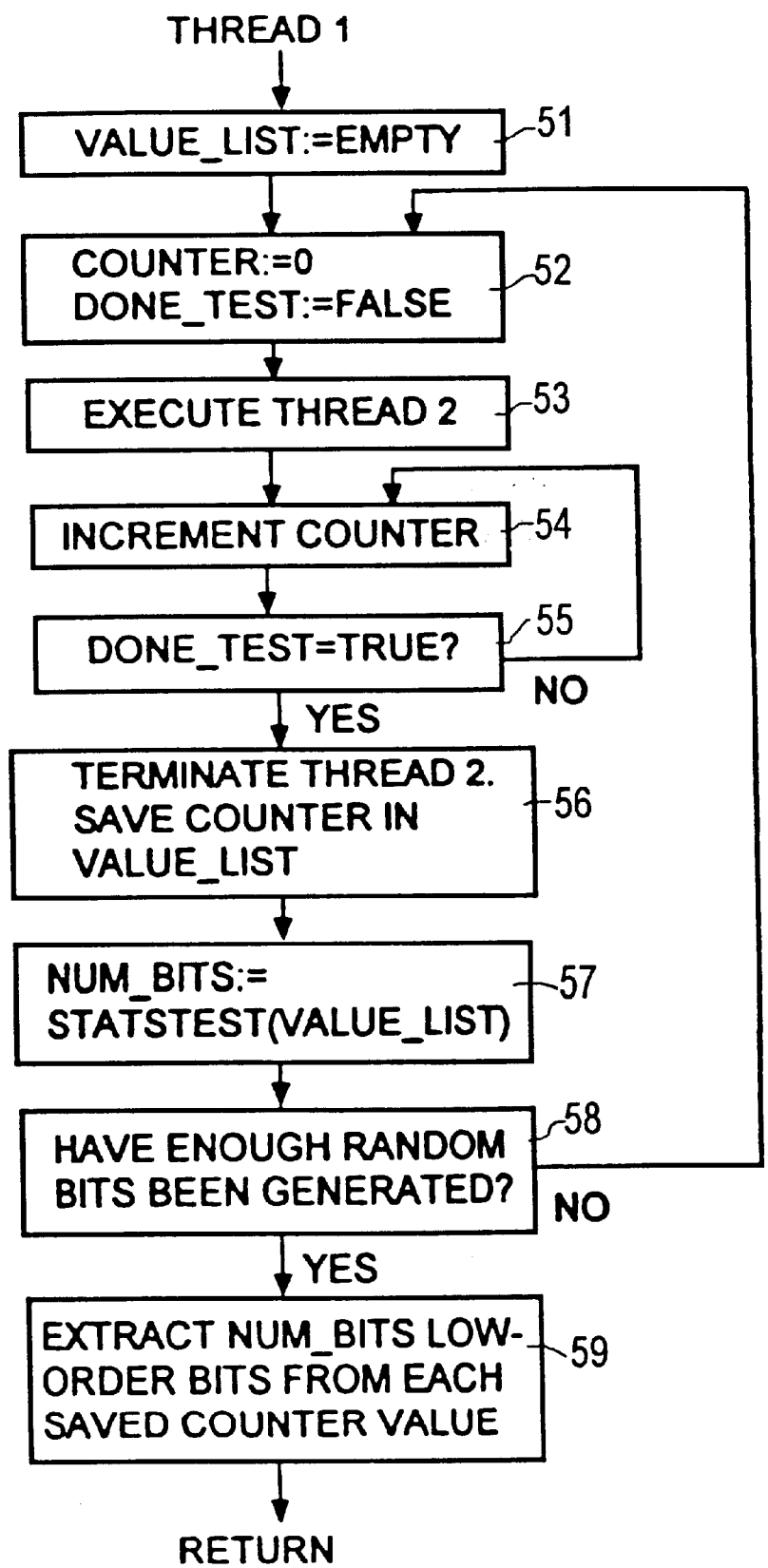
FIG. 4 is a flowchart showing the operation of a random number generator used to generate nonces.

Next, the nonce generator builds a random number, using a random number generator. The random number generator consists of two process threads, referred to herein as Thread 1 and Thread 2. FIG. 4 shows the operation of Thread 1, which is the main thread of the random number generator.

(Box 51) Thread 1 first creates a data structure value_list for holding a list of counter values. The list is initially empty.

(Box 52) Thread 1 sets a current counter value to zero and sets a done test flag to FALSE.

(Box 53) Thread 1 then forks Thread 2. Thread 2 posts an asynchronous disk access, and then sleeps until the disk access is complete. When the disk access is complete, Thread 2 sets the done_test flag to TRUE. Note that Thread 1 and Thread 2 share the done_test flag.

(Box 54) Thread 1 increments the counter value by one.

(Box 55) Thread 1 then tests whether the done_test flag is now TRUE, indicating that the disk access initiated by Thread 2 is complete. If done_test flag is FALSE, the thread returns to box 54. Thus it can be seen that, while waiting for the disk access to complete, Thread 1 continually increments the counter value.

(Box 56) When done_test flag is TRUE, Thread 1 terminates Thread 2, and saves the counter value in the first free location in value list.

(Box 57) Thread 1 then calls a Statstest function, which estimates the degree of randomness of the counter values (or portions of counter values, e.g., low-order bits) saved in value_list. This function may use the Chi-Square Test, the Kolmogorov-Smirnov Test, or the Serial Correlation Test, which are described in the Knuth book. The Statstest function may be optimized to ensure that complicated calculations are not repeated for each disk access. The Statstest function returns a value which indicates how many low-order bits of each saved counter value should be considered random.

(Box 58) Thread 1 compares the value returned by the Statstest function when combined with the length of the value_list with a predetermined threshold value, to determine whether enough random bits have now been generated. If not enough random bits have been generated, the process returns to box 52 above so as to generate and save another counter value.

(Box 59) When the required number of random bits has been generated, Thread 1 extracts the specified number of low-order bits from each counter value in the value_list and returns this sequence of bits as the output random number.

In summary, it can be seen that the random number generator exploits the unpredictability in the timing of a series of disk accesses as a source of randomness in the generation of nonces (see the publication by Fenstermacher). By forking new threads on each disk access, the random number generator also exploits unpredictabilities in the operation of the operating system's scheduler as a second source of randomness.

The analysis performed by the Statstest function permits the random number generator to self-tune for any speed processor and disk by computing the number of low-order bits of each saved counter value to return. For example, a system with a high-variance disk access time will generate more random bits per-disk access than a system with a low-variance disk access time. For example, for a Quantum 1080s disk (6 ms average write time), and a 486 (Intel 80486) 66 Mhz processor, the system generates approximately 45 bits per second. Alternatively, one may hard code the number of bits per-disk access and use a de-skewing technique to ensure a good degree of randomness.

The nonce generator also queries the operating system to ensure that it posts each disk access to an actual disk. The final output nonce is formed by combining the output random number from the random number generator with the result of querying the system parameters as described above using a message digest.

The nonce generator described above works best when executing on an operating system that provides direct access to the disk, e.g., Microsoft Windows 95 or Microsoft Windows NT 4.0. In such an operating system, special operating system calls available to programs executing in user space permit a program to bypass the operating system's internal buffering mechanism and write directly to the disk. Most programs do not take advantage of these special operating system calls because they may be relatively inefficient and difficult to use. On Windows 95 and Windows NT operating systems, a program may only use these special calls if the program accesses data that is a multiple of the disk's sector size by querying the operating system.

If the operating system does not provide direct access to the disk, then the challenge mechanism 24 could still use the disk timing random number generator. However, in this case, the quality of the generated values would have a greater reliance upon unpredictabilities in the operating system's scheduler as opposed to the variance inherent to the disk access time.

The example of the invention described above assumes that the operating system permits a program to fork multiple threads within a single address space. Additionally, the example of the invention assumes that the operating system permits the threads to access synchronization variables, such as semaphores. Most modern operating systems provide these services. The example of the invention uses multiple threads to implement a mechanism which quantifies each disk access time. However, if an implementation of the invention were to execute on a system that does not provide multiple threads or synchronization variables, then the nonce generator could substitute other mechanisms, e.g. querying a physical clock.

Some Possible Modifications

The customer need not get the software by downloading the software from a network bulletin board. The customer may also get the software on a floppy disk, CD-ROM, DVD, a PC store, via the Internet, or other distribution media.

Alternatively, the protection server 20 could also use a probabilistic encryption scheme, for example the Blum-Goldwasser probabilistic public-key encryption scheme, to make sure that only the customer possesses the proper private keying material.

Thus, it can be seen that it is only important in accordance with the present invention that an asymmetric confidentiality proof is used.

Furthermore, a smart card may be used to store and access the customer's private keying material (or the vendor's private keying material used in keyfile generation). In such a smart card-enabled configuration, a pirate cannot extract the private keying material from the smart card, which provides an even greater defense against attack. Some smart cards do not execute until the user supplies a correct password or personal identification number.

We may optionally extend this present example by constructing the challenge means to reference an internal timer, e.g., a counting thread, or an external timer, e.g., a clock. If an a priori defined threshold terminates before completing the probabilistic proof protocol, then the validation automatically fails.

In addition to implementing copy protection, the invention may be used to trace software pirates. The mechanism provides excellent traceability, without requiring that each customer obtains a unique version of the program.

The protection server 20, the challenge mechanism 24, and the protected software 103 described above may be deployed in a number of different configurations.

For example:

The protection server 20 may reside in one address space and the challenge mechanism 24 and the protected software 103 may reside in a different address space in a single machine.

The protection server 20 may reside in an address space on 25 one machine and the challenge mechanism 24 and the protected software 103 may reside in a different address space on a different machine.

Furthermore, multiple customers, each with their own copy of the protected item of software, may share a common protection server 20 which responds to challenges from all these copies.

Another alternative is that multiple customers may share common private keying material. A company may use one or more of these deployment options, for example, when constructing multi-user licensing functionality.

In another possible modification, the keyfile 105 may contain hidden information concerning selective activation of services of the protected program 103. For example, the keyfile 105 may specify that the protected program 103 may permit execution of a Print service but disable execution of a Save-On-Disk service. As another example, the keyfile 105 may contain an expiration date that describes the last date that a particular service may execute. The protected program 103 would read the keyfile 105 to determine the services that the protected program 103 should execute. A customer could obtain the ability to execute more services by requesting another keyfile from the vendor.

In another possible modification, the protected program could distribute the result of the asymmetric confidentiality proofs to other programs. These other programs could use this result to help determine if the other programs should cease executing, or be executed in a limited manner.

Although other modifications and changes may be suggested by those skilled in the art, it is the intention of the inventors to embody within the patent warranted hereon all changes and modifications as reasonably and properly come within the scope of their contribution to the art.

We claim:

1. A computer system, comprising:
   computer-readable media encoded with data structures including:
      a protection mechanism for protecting software, the protection mechanism including challenge means for issuing a challenge and associated with a protected item of software, and
      response means for responding to said challenge with private keying material that it can access, wherein said challenge means has no access to the private keying material,
      said challenge means and said response means have means for generating shared secret information, respectively, in accordance with an asymmetric confidentiality scheme,
      said response means having means for providing to said challenge means that said response means has access to the private keying material by interacting with said challenge means using an asymmetric confidentiality proof scheme,
      said challenge means having means for prohibiting a customer from using at least some of said items of software unless a proof is successful.

2. The computer system according to claim 1, further comprising:
   means for validating a response means proof that a response means knows the shared secret information and for prohibiting a customer from using at least some of the items of software unless the proof is successful,
   said means for generating including a random data generator having at least two degrees of randomness for said shared secret information of said challenge.

3. A computer system according to claim 1, wherein said response means includes means for proving to said challenge means that said response means discovered the shared secret information.

4. A computer system according to claim 2, wherein said challenge means includes
   means for validating said response means' proof that said response means discovered said shared secret information.

5. A computer system according to claim 4, wherein said challenge means includes means for validating said response means' proof that said response means discovered the shared secret information by validating a demonstration that said response means discovered a value of the shared secret information.

6. A computer system according to claim 1, wherein said challenge means includes means for encrypting information and then sending said encrypted information to said response means,
   said response means includes means for decrypting said encrypted information and generating the shared secret information, and then proving that said response means knows the shared secret information.

7. A computer system according to claim 1, wherein said asymmetric confidentiality scheme is a Blum-Goldwasser scheme.

8. A computer system according to claim 1, wherein said means for introducing two degrees of randomness generates said two degrees of randomness for a random challenge by repeatedly timing responses to device accesses.

9. The computer system according to claim 1, wherein said means for issuing a random challenge includes means for forking new threads in such a manner as to introduce an additional degree of randomness into said random challenge by exploiting unpredictabilities in an operating system's scheduler.

10. A computer system according to claim 8, wherein said means for generating two degrees of randomness includes as a means for generating a first degree of randomness
    means for performing a statistical test to determine a number of random bits obtained by each of said device accesses, and
    means for causing device accesses to be repeated until a predetermined number of random bits has been obtained.

11. A computer system according to claim 1, wherein said challenge means is embedded in said protected item of software.

12. A computer system according to claim 1, wherein said challenge means uses public keying material for encrypting the shared secret information.

13. A computer system according to claim 12, further comprising:
    a keyfile for holding the public keying material.

14. A computer system according to claim 13, wherein the public keying material held in said keyfile is cryptographically secured, it being computationally infeasible to alter any portion of the keyfile including the public keying material without altering said challenge means.

15. A computer system according to claim 14, wherein said keyfile includes information identifying a customer to which the protected item of software has been supplied.

16. A computer system according to claim 15, wherein said keyfile includes decoy bits for disguising the first public keying material held therein.

17. A computer system according to claim 15, wherein said keyfile includes information concerning selective activation of services of the protected item of software.

18. A computer system according claim 1, further comprising:
    a plurality of protected items of software on computer readable media, each having its own challenge means, and
    a single response means shared between all of said protected items.

19. A method for protecting software, comprising:
    associating at least one challenge means with a protected item of software, and accessing private keying material with at least one response means, the challenge means has no access to the private keying material, generating shared secret information with the challenge means and the response means, respectively, in accordance with an asymmetric confidentiality scheme, the response means proving to the challenge means that the response means has access to the private keying material, the challenge means prohibiting a customer from using some or all of said items of software unless a proof is successful.

20. The method of protecting software according to claim 19, further comprising distributing the software to a plurality of customers, and providing each customer with a computer system having a protection mechanism for protecting the software.

21. A method according to claim 19, wherein the response means proves to the challenge means that the response means discovered the shared secret information.

22. A method according to claim 19, wherein the challenge means validates the response means' proof that the response means discovered the shared secret information.

23. A method according to claim 22, further comprising the step of:

the challenge means validating the response means' proof that the response means discovered the shared secret by validating a demonstration that the response means discovered the value of the shared secret.

24. A method according to claim 19, wherein said challenge means encrypting information and then sending said encrypted information to said response means, said response means decrypting said encrypted information and generating the shared secret information, and then proving that the response means knows the shared secret information.

25. A method according to claim 19, wherein said asymmetric confidentiality scheme is a Blum-Goldwasser scheme.

26. A method according to claim 19, wherein at least one degree of randomness of said generating shared secret information is generated by repeatedly timing responses to disk accesses.

27. The method for protecting software according to claim 19, wherein said challenge means issues a random challenge, and said shared secret information includes said random challenge, the random challenge being generated by repeatedly timing response to disk accesses, and the random challenge being generated in a way that new threads are forked in such a manner as to introduce an additional degree of randomness into said random challenge by exploiting unpredictabilities in an operating system's scheduler.

28. A method according to claim 26, further comprising the steps of:

the random challenge being generated in a way that a statistical test is performed to determine a number of random bits obtained by each of said disk accesses, and repeating disk accesses until a predetermined number of random bits has been obtained.

29. A method according to claim 19, further comprising the step of:

embedding said challenge means in said protected item of software.

30. A method according to claim 19, wherein said challenge means using first public keying material for encrypting the information.

31. A method according to claim 19, further comprising the step of:

holding the first public keying material in a keyfile.

32. A method according to claim 31, wherein the first public keying material held in said keyfile is cryptographically secured, whereby it is computationally infeasible to alter any portion of the keyfile, including the first public keying material, without altering the challenge means.

33. A method according to claim 32, wherein said keyfile includes information identifying the customer to which the protected item of software has been supplied.

34. A method according to claim 32, wherein said keyfile includes decoy bits for disguising the first public keying material held therein.

35. A method according to claim 32, wherein said keyfile includes information concerning selective activation of services of the protected item of software.

36. A method according to claim 19, further comprising the step of:

providing a plurality of protected items of software, each having its own challenge means, and a single response means shared between all of said protected items.

37. A computer system according to claim 2, wherein the response means includes means for proving to the challenge means that the response means discovered the shared secret information.

38. A computer system according to claim 2, wherein said challenge means includes means for encrypting information and then sending said encrypted information to said response means, said response means includes means for decrypting said encrypted information and generating the shared secret information, and then proving that said response means knows the shared secret information.

39. A computer system according to claim 2, wherein said asymmetric confidentiality scheme is a Blum-Goldwasser scheme.

40. A computer system according to claim 38, wherein at least one degree of randomness is generated by repeatedly timing responses to device accesses.

41. The computer system according to claim 38, wherein said challenge means includes means for issuing a random challenge, and said shared secret information includes said random challenge, and said means for generating a random challenge includes means for forking new threads in such a manner as to introduce an additional degree of randomness into said random challenge by exploiting unpredictabilities in an operating system's scheduler.

42. A computer system according to claim 38, wherein said means for generating a random challenge includes means for performing a statistical test to determine a number of random bits obtained by each of said device accesses, and means for causing device accesses to be repeated until a predetermined number of random bits has been obtained.

43. A computer system according to claim 2, wherein said challenge means is embedded in said protected item of software.

44. A computer system according to claim 2, wherein said challenge means uses public keying material for encrypting the information.

45. A computer system according to claim 2, wherein the system includes a keyfile for holding public keying material.

46. A computer system according to claim 45, wherein the public keying material held in said keyfile is cryptographically secured, wherein it is computationally infeasible to alter any portion of the keyfile including the public keying material without altering the challenge means.

47. A computer system according to claim 46, wherein said keyfile includes information identifying a customer to which the protected item of software has been supplied.

48. A computer system according to claim 47, wherein said keyfile includes decoy bits for disguising the first public keying material held therein.

49. A computer system according to claim 47, wherein said keyfile includes information concerning selective activation of services of the protected item of software.

50. A computer system according to claim 2, further comprising:

a plurality of protected items of software, each having its own challenge means, and a single response means shared between all of said protected items.

* * * * *